United States Patent
Hsieh

(10) Patent No.: US 12,012,796 B2
(45) Date of Patent: Jun. 18, 2024

(54) DOOR OPERATOR WITH AN ABNORMAL VOLTAGE PROTECTION FUNCTION AND METHOD FOR PROTECTION OF A DOOR OPERATOR FROM AN ABNORMAL VOLTAGE

(71) Applicant: Chung Hsien Hsieh, New Taipei (TW)

(72) Inventor: Chung Hsien Hsieh, New Taipei (TW)

(*) Notice: Subject to any disclaimer, the term of this patent is extended or adjusted under 35 U.S.C. 154(b) by 230 days.

(21) Appl. No.: 17/857,323

(22) Filed: Jul. 5, 2022

(65) Prior Publication Data

US 2023/0116603 A1 Apr. 13, 2023

(30) Foreign Application Priority Data

Oct. 7, 2021 (TW) .................. 110137292

(51) Int. Cl.
| | | |
|---|---|---|
| *E05F 15/70* | (2015.01) | |
| *E05F 15/40* | (2015.01) | |
| *E05F 15/603* | (2015.01) | |

(52) U.S. Cl.
CPC ............ *E05F 15/40* (2015.01); *E05F 15/603* (2015.01); *E05Y 2400/445* (2013.01); *E05Y 2400/512* (2013.01); *E05Y 2400/61* (2013.01)

(58) Field of Classification Search
CPC .... E05F 15/70; E05F 15/40; E05Y 2400/445; E05Y 2400/512; E05Y 2400/61; H02P 2203/07; H02P 1/20
See application file for complete search history.

(56) References Cited

U.S. PATENT DOCUMENTS

2011/0113689 A1* 5/2011 Johnson ................. E05F 15/70
49/31
2013/0119910 A1* 5/2013 Marvin ..................... B66B 1/30
318/434

FOREIGN PATENT DOCUMENTS

| CN | 103713526 A | 4/2014 |
| CN | 106253651 A | 12/2016 |

OTHER PUBLICATIONS

Search report accompanying Office Action mailed Mar. 17, 2022 in Taiwan application No. 110137292.
Office Action mailed Mar. 17, 2022 in Taiwan application No. 110137292.

* cited by examiner

*Primary Examiner* — Cortez M Cook
(74) *Attorney, Agent, or Firm* — McClure, Qualey & Rodack, LLP

(57) ABSTRACT

The present invention relates to a door operator with an abnormal voltage protection function and a method for abnormal voltage protection of a door operator. According to the present invention, before a door operator motor is electrically energized by an external power source, a controller determines whether the external power source meets the rated voltage of the door operator. In the case that the external power source meets the rated voltage, the controller activates the door operator motor; in the case that the external power source does not meet the rated voltage, the door operator motor is deactivated, and the controller issues a warning.

10 Claims, 8 Drawing Sheets

DOOR OPERATOR WITH AN ABNORMAL VOLTAGE PROTECTION FUNCTION AND METHOD FOR PROTECTION OF A DOOR OPERATOR FROM AN ABNORMAL VOLTAGE

BACKGROUND OF THE INVENTION

Field of the Invention

The present invention relates to a door operator with an abnormal voltage protection function and a method for protection of a door operator from an abnormal voltage, in particular to a protection circuit for an electric rolling door operator capable of avoiding damage to a circuit or electronic components caused by an excessive or unstable input voltage.

Description of the Related Art

Currently, the power source for a typical door operator includes a single-phase power and a three-phase power, wherein the single-phase power is of 115V or 230V, and the three-phase power is of 230V or 460V. Therefore, prior to installation of a conventional door operator, an installation operator has to make sure that the model of the door operator selected conforms to the specification of the power source available at an installation site and has to confirm the specification of the power source and the magnitude of the voltage again and again upon installation of the door operator. If the door operator is connected to a lower voltage power source, the door operator cannot be driven. If the door operator is connected to a higher voltage power source, it may cause failure of the door operator or even cause damage of the internal circuit of the door operator.

On the other hand, the conventional door operator has no corresponding protection mechanism against an unstable power source. As such, this often leads to an unexpected effect on the operation of the door operator, such as abnormal shutdown or unexpected acceleration of a door operator motor, and even leads to failure of the door operator.

Accordingly, a protection device or method capable of effectively avoiding failure or damage of the door operator caused by connection to an incompatible or unstable power source is highly expected in the industry.

SUMMARY OF THE INVENTION

The main object of the present invention is to provide a door operator with an abnormal voltage protection function and a method for protection of a door operator from an abnormal voltage capable of effectively avoiding failure of the door operator caused by the fact that the door operator is incorrectly connected to an external power source incompatible with the rated voltage of the door operator.

In order to achieve the above object, a door operator with an abnormal voltage protection function of the present invention mainly comprises a power connection part, an overvoltage protection module, a linear transformer, a controller, a switch module and a door operator motor. The overvoltage protection module is electrically coupled to the power connection part and comprises a thermistor and a wirewound resistor connected in parallel; the linear transformer is electrically coupled to the overvoltage protection module; the controller is electrically coupled to the linear transformer; the switch module is electrically coupled to the controller; the door operator motor is electrically coupled to the controller, wherein when the power connection part is electrically connected to an external power source, the controller is electrically energized by the external power source through the thermistor and the linear transformer, and the controller determines whether a voltage of the external power source is out of a preset range or not; when the voltage of the external power source meets the preset range, the controller activates the switch module, the controller is electrically energized by the external power source through the switch module, and the controller outputs a control command to the door operator motor; when the input voltage of the external power source is out of the preset range, the controller does not activate the switch module, and when a resistance value of the thermistor is increased beyond a resistance value of the wirewound resistor, the controller is electrically energized by the external power source through the wirewound resistor and the linear transformer, and the controller issues a warning.

Accordingly, in the present invention, by means of the above configuration, before the door operator motor is electrically energized by the external power source, the controller determines whether the external power source meets a preset rated voltage or not. In the case that the external power source meets the rated voltage, the controller activates the door operator motor. In the case that the external power source does not meet the rated voltage, the door operator motor is deactivated, and the controller issues a warning. Moreover, when the input voltage of the external power source is excessively high, a power supply path from the external power source is automatically shifted from the thermistor to the wirewound resistor. The wirewound resistor is so configured that electric power supplied to the controller is sufficient for the controller to operate and to issue a warning with no internal components of the door operator being damaged.

Preferably, the door operator with the abnormal voltage protection function according to the present invention further comprises a reset button which is electrically coupled to the controller and used to clear a detected input voltage value of the external power source temporarily stored in the controller. During a process of electrically energizing the controller by the external power source through the switch module, when the voltage of the external power source fluctuates out of a working voltage range, the controller stops outputting the control command to the door operator motor and issues another warning until the reset button is depressed or the voltage of the external power source meets the working voltage range for a specific time period. Once the reset button is depressed or the voltage of the external power source meets the working voltage range for a specific time period, the controller resumes outputting the control command to the door operator motor and stops issuing the another warning.

In other words, during the operation of the door operator, in the case that the input voltage of the external power source fluctuates abnormally, the door operator of the present invention automatically activates a protection mechanism to disable the operation of the door operator motor immediately until the input voltage returns to a normal voltage for a time period or the reset button is manually depressed by the user. Once the input voltage returns to a normal voltage for a time period or the reset button is manually depressed by the user, normal operation of the door operator motor is forcibly resumed.

Furthermore, in order to achieve the above object, the present invention is to provide a door operator with an abnormal voltage protection function, comprising a power connection part, an overvoltage protection module, a linear transformer, a controller and a door operator motor, wherein the overvoltage protection module is electrically coupled to the power connection part and comprises a fuse and a wirewound resistor connected in parallel; the linear transformer is electrically coupled to the overvoltage protection module; the controller is electrically coupled to the linear transformer; the door operator motor is electrically coupled to the controller. When the power connection part is electrically connected to an external power source with an input current being smaller than a fusing current, the controller is electrically energized by the external power source through the fuse and the linear transformer, and the controller determines whether an input voltage of the external power source meets a working voltage range or not; when the input voltage meets the working voltage range, the controller outputs a control command to the door operator motor; when the input voltage is out of the working voltage range, the controller issues a warning; on the other hand, when the input current of the external power source is greater than the fusing current, the fuse is blown and opened, the controller is electrically energized by the external power source through the wirewound resistor and the linear transformer, and the controller issues the warning.

In the present invention, the fuse and the wirewound resistor can also be used to carry out the overvoltage protection procedure during the installation of the door operator. Once the input current is greater than the rated fusing current of the fuse, the blown fuse automatically interrupts electric power. At this time, the controller is electrically energized by the external power source through the wirewound resistor instead. Of course, if the input current is small than the fusing current of the fuse (i.e. the input current meets the preset specification of the door operator, the controller is electrically energized by the external power source through the fuse. At this time, the controller further determines whether the input voltage of the external power source meets the working voltage range. If the input voltage is not out of this range, the controller activates the door operator motor. If the input voltage is out of the working voltage range, the controller does not activate the door operator motor and issues a warning.

Moreover, in order to achieve the above object, a method for protection of a door operator from an abnormal voltage, comprising the steps of: providing an external power source to a power connection part, the power connection part being electrically coupled to an overvoltage protection module, the overvoltage protection module comprising a thermistor and a wirewound resistor connected in parallel; electrically energizing a controller through the thermistor and a linear transformer by the external power source; and by means the controller, determining whether an input voltage of the external power source is out of a preset range or not, wherein when the input voltage meets the preset range, the controller activates a switch module so that the controller is electrically energized by the external power source through the switch module, and the controller outputs a control command to a door operator motor; when the input voltage is out of the preset range, the controller deactivates the switch module, and when a resistance value of the thermistor increases beyond a resistance value of the wirewound resistor, the controller is electrically energized by the external power source through the wirewound resistor and the linear transformer, and the controller issues a warning.

In other words, the method provided by the present invention can effectively avoid damage to the internal components of the door operator caused by connection to an incompatible external power source during the installation of the door operator because the main controller functions to determine whether the input voltage meets the rated voltage of the door operator before the door operator motor is put into operation. In the case that the input voltage does not meet the rated voltage of the door operator, the door operator is deactivated and a warning is issued, and at the same time, the overvoltage protection module activates a protection mechanism to provide an appropriate current to the controller in such a manner that the controller can be normally operated without damage to other components.

Furthermore, during the operation of the door operator, if the input voltage varies drastically, the method for protection of the door operator from abnormal voltage according to the present invention also provides a protection mechanism. The controller disables the operation of the door operator motor and issues another warning until the input voltage returns to the normal voltage value for a time period or the reset button is depressed by the user. Once the input voltage returns to the normal voltage value for a time period or the reset button is depressed by the user, the controller resumes the operation of the door operator motor.

Even if the door operator is connected to an external power source which does not meet the rated voltage during installation, the present invention can completely avoid the damage to the components of the door operator caused by an excessive input voltage. When the input voltage is too low, the main controller issues a warning for actively notifying the user. In addition, during the normal operation of the door operator, if the input voltage fluctuates drastically, the present invention activates a protection mechanism. The operation is disabled until the voltage returns to the normal voltage value. The operation can be resumed once the voltage returns to the normal voltage value. Alternatively, the operation of the door operator motor can be forcibly resumed by the user.

DESCRIPTION OF THE PREFERRED EMBODIMENTS

Figure 1:
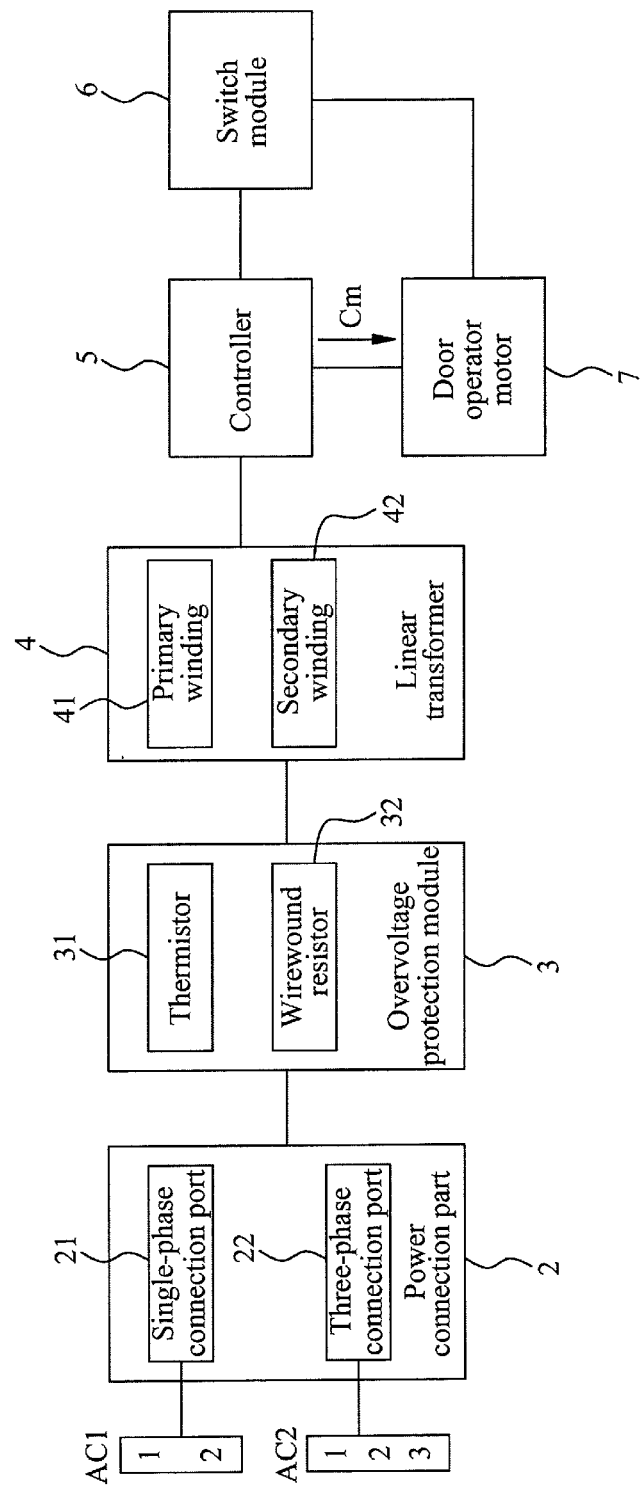
FIG. 1 is a system architecture diagram of a first embodiment of the present invention.

Before a door operator with an abnormal voltage protection function and a method for protection of a door operator from abnormal voltage according to the present invention are described in detail in the embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Figure 2:
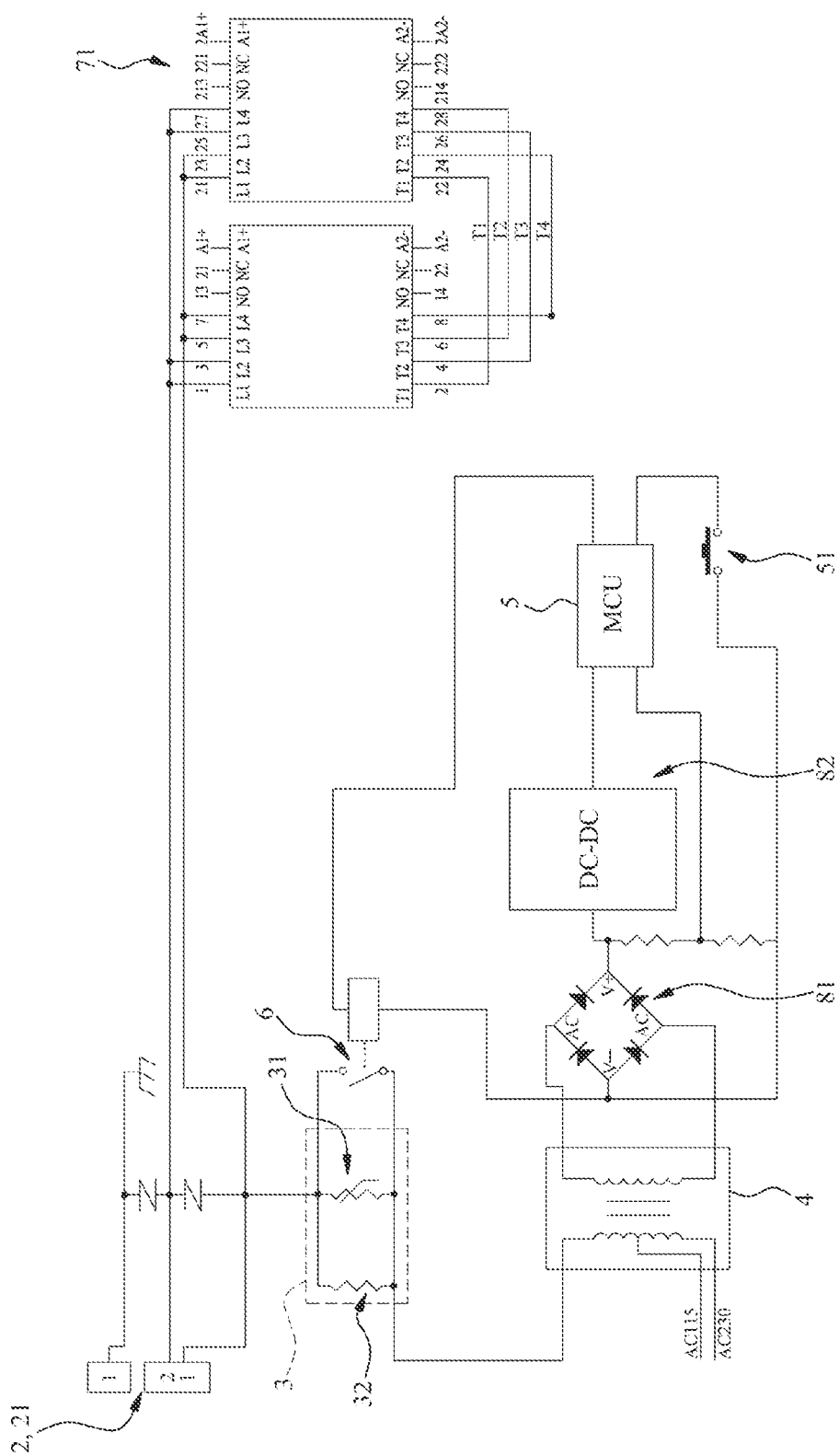
FIG. 2 is a circuit diagram with a single-phase power source connected according to the first embodiment of the present invention.
Figure 3:
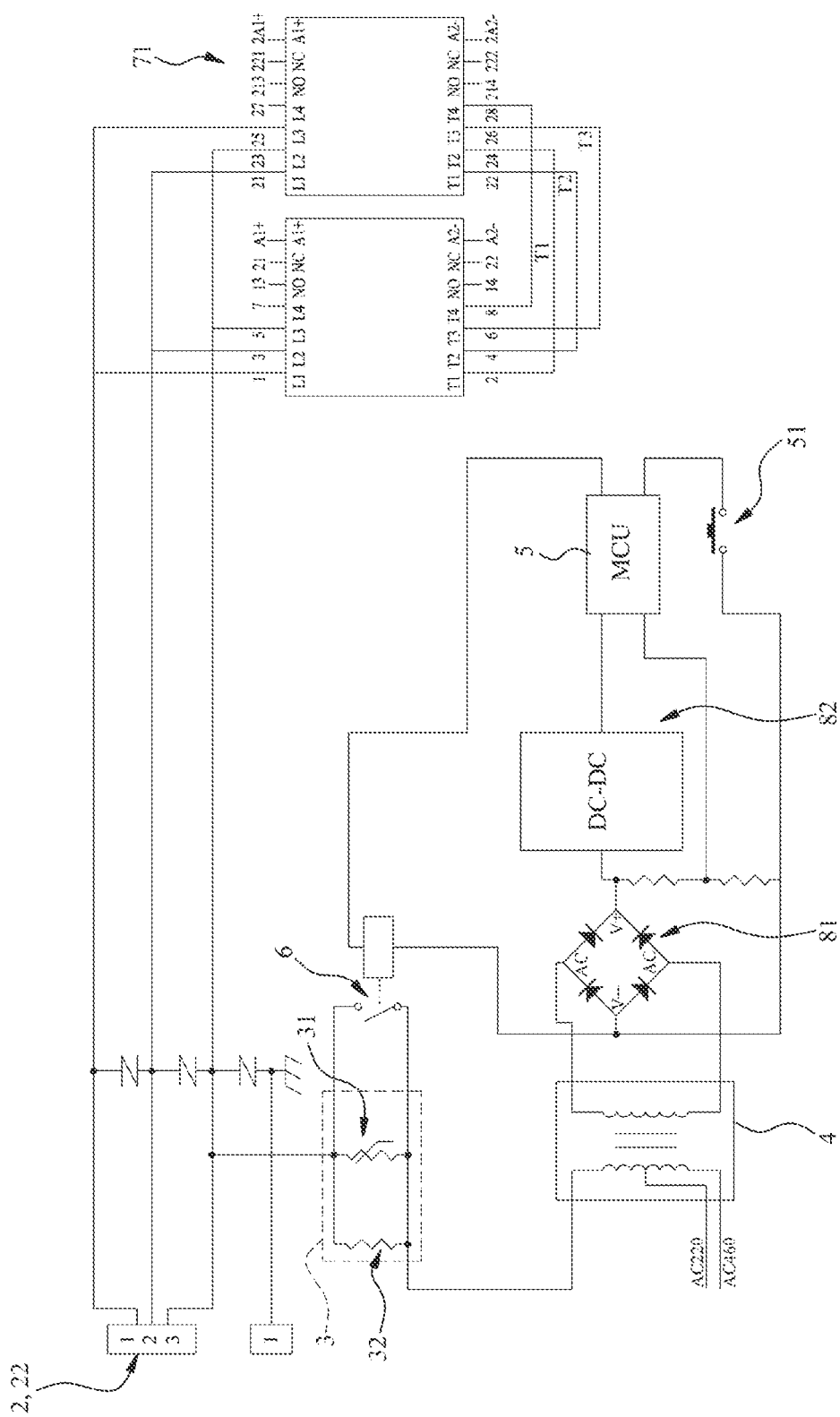
FIG. 3 is a circuit diagram with a three-phase power source connected according to the first embodiment of the present invention.

Reference is made to FIG. 1, FIG. 2 and FIG. 3, wherein FIG. 1 is a system architecture diagram of a first embodiment of the present invention, FIG. 2 is a circuit diagram with a single-phase power source connected according to the first embodiment of the present invention, and FIG. 3 is a circuit diagram with a three-phase power source connected according to the first embodiment of the present invention. As shown in the figures, the door operator with an abnormal voltage protection function in this embodiment mainly includes a power connection part 2, an overvoltage protection module 3, a linear transformer 4, a controller 5, a switch module 6 and a door operator motor 7. The power connection part 2 includes a single-phase connection port 21 for connection to a single-phase power source and a three-phase connection port 22 for connection to a three-phase power source. This embodiment can be selectively connected to a single-phase external power source or a three-phase external power source. The circuit designs for the single-phase power source and the three-phase power source provided in this embodiment are shown in FIG. 2 and FIG. 3.

Furthermore, the power connection part 2 is electrically coupled to the overvoltage protection module 3, which includes a thermistor 31 and a wirewound resistor 32 connected in parallel. The thermistor 31 in this embodiment is a ceramic positive temperature coefficient thermistor having a characteristic that if a current flowing through the thermistor from the single-phase connection port 21 is greater than 137 mA or if a current flowing through the thermistor from the three-phase connection port 22 is greater than 55 mA, the impedance of the thermistor 31 increases drastically under effect of heat. On the other hand, in this embodiment, the resistance value of the wirewound resistor 32 electrically coupled to the single-phase connection port 21 is 2.4 KΩ, and the resistance value of the wirewound resistor 32 electrically coupled to the three-phase connection port 22 is 12 KΩ.

Moreover, the other side of the overvoltage protection module 3 is electrically coupled to the primary winding 41 of the linear transformer 4, and the secondary winding 42 of the linear transformer 4 is electrically coupled to a rectifier 81, which is a bridge rectifier. The other side of the rectifier 8 is electrically coupled to a DC-DC transformer 82 which functions to transfer a voltage into a working voltage for the controller 5, for example, 5V. Also, as shown in the figures, the controller 5 is electrically coupled to a switch module 6, a door operator motor 7 and a reset button 51. In this embodiment, a relay serves as the switch module 6, and the reset button 51 is used to clear relevant recorded parameters or measured values temporarily stored in the controller 5 such as the detected voltage values of external power sources AC1 and AC2. A connector 71 shown in FIGS. 2 and 3 is connected to the door operator motor 7.

Figure 4:
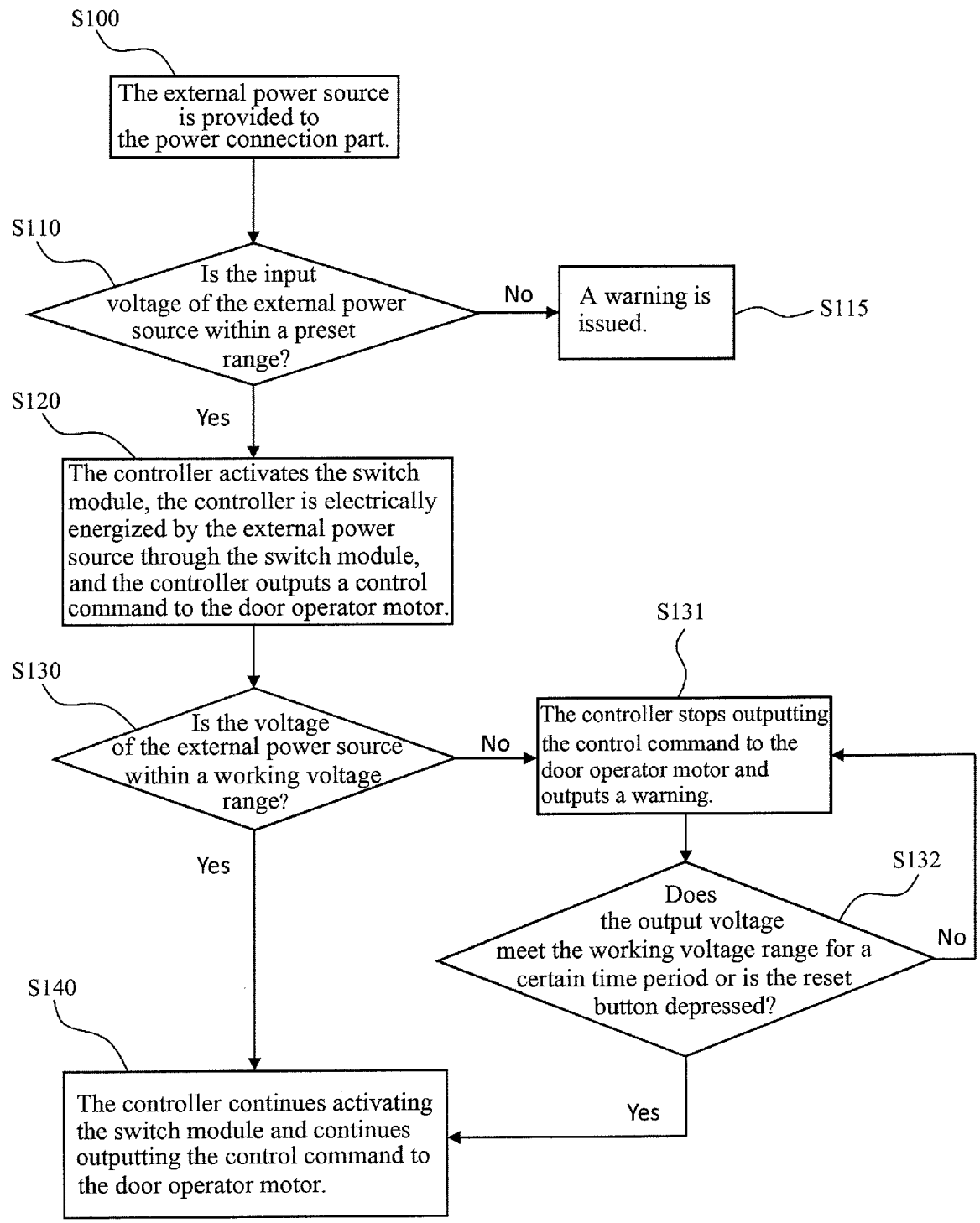
FIG. 4 is a flowchart of a method for abnormal voltage protection according to the first embodiment of the present invention.

Reference is made to FIG. 4 which is a flow chart of a method for abnormal voltage protection according to the first embodiment of the present invention. The operation procedure and the control method of this embodiment will be described in detail below.

In the step S100 shown in FIG. 4, when the door operator is to be installed, the single-phase connection port 21 or the three-phase connection port 22 is selected according to the external power source AC1 or AC2 available at the installation site and electrically connected to the external power source AC1 or AC2. Once the single-phase connection port 21 or the three-phase connection port 22 is connected to the external power source AC1 or AC2, the input current of the external power source AC1 or AC2 is supplied to the controller 5 through the thermistor 31 of the overvoltage protection module 3 and the linear transformer 4. Because the current input from the external power source AC1 or AC2 at the beginning does not cause the impedance value of the thermistor 31 to rise drastically at normal temperature, the input current flows into the controller 5 through the thermistor 31, the linear transformer 4, the rectifier 81 and the DC transformer 82.

Next, in the step S110 shown in FIG. 4, the controller 5 determines whether the voltage of the external power source AC1 or AC2 is out of a preset range or not. In this embodiment, the preset range is within 1.5 times of the standard voltage of the external power source AC1 or AC2. In the case of the external power source AC2 of 220V three-phase alternating current, the preset range pre-stored in the controller 5 is within 330V. Moreover, in this embodiment, when the voltage of the external power source AC1 or AC2 is out of the preset range, a voltage 24V is output from the secondary winding 42 of the linear transformer 4 in order to maintain a working voltage for operation of the controller 5 and for issuance of a warning. In addition, in this embodiment, when the voltage of the external power source AC1 or AC2 is twice the standard voltage, the current flowing through the primary winding 41 of the linear transformer 4 is four times the current at the standard voltage.

If the voltage of the external power source AC1 or AC2 exceeds 330V (for example, the voltage of the external power source AC1 or AC2 is of 460V), the controller 5 does not output a control signal Cm and does not activate the switch module 6. Because the current flowing from the three-phase connection port 22 exceeds 55 mA, the resistance value of the thermistor 31 increases drastically beyond the resistance value of the wirewound resistor 32. At this time, in the step S115 shown in FIG. 4, a protection mechanism is activated, and the power supply path of the external power source AC1 or AC2 is automatically shifted to the wirewound resistor 32 having a smaller resistance through which the external power source AC1 or AC2 is connected to the linear transformer 4 so as to electrically energize the controller 5 and to cause the controller 5 to issue a warning, such as a warning light or a warning sound for notifying the field operator who implements installation of the door operator. At this time, the field operator needs to disconnect the door operator from the connected one of the external power sources AC1 and AC2 and then connect the door operator with the other of the external power sources AC1 and AC2. Alternatively, the field operator may replace the door operator with another one compatible with the external power sources AC1 or AC2 currently available at the installation site.

On the other hand, in the step S120 shown in FIG. 4, when the voltage of the external power source AC1 or AC2 meets the preset range, the controller 5 activates the switch module 6, the external power source AC1 or AC2 is connected to the linear transformer 4 through the switch module 6 so as to electrically energize the control controller 5, and the controller 5 outputs a control command Cm to the door operator motor 7 to activate the door operator motor 7.

In the normal operation state of the door operator, this embodiment also provides a protection mechanism against abnormal fluctuation of the input voltage, which will be described in detail as follows. In the step S130 shown in FIG. 4, during operation of the door operator, the controller 5 detects the input voltage of the external power source AC1 or AC2 in real time and determines whether the input voltage fluctuates out of a working voltage range. In this embodiment, the working voltage range is set to the standard voltage of the external power source AC1 or AC2±20%. For example, in the case of the external power source AC2 is a three-phase AC power of 220V, the working voltage range is 176V to 264V.

In the step S140 shown in FIG. 4, if the input voltage of the external power source AC1 or AC2 is in a stable state in which the input voltage does not fluctuate out of the working voltage range of 176V to 264V, the controller 5 continues activating the switch module 6, and the controller 5 continues outputting the control command Cm to the door operator motor 7.

In the step S131 shown in FIG. 4, if the input voltage of the external power source AC1 or AC2 fluctuates suddenly and drastically (for example, the input voltage suddenly exceeds 264V or drops below 176V), the controller 5 stops outputting the control command Cm to the door operator motor 7, i.e. the operation of the door operator is disabled. At the same time, another warning, such as a warning light or a warning sound is issued to notify the field operator.

In the step S132 shown in FIG. 4, after the input voltage of the external power source AC1 or AC2 returns to a stable state for a time period, and more specifically, after the controller 5 determines that the voltage of the external power source AC1 or AC2 meets the working voltage range for a certain time period, the controller 5 resumes outputting the control command Cm to the door operator motor 7 and stops issuing the warning.

Alternatively, in this embodiment, the operation of the door operator motor 7 can be manually and forcibly resumed. The field operator can depress the reset button 51 to forcibly clear the relevant recorded parameters or measured values temporarily stored in the controller 5, such as the detected voltage values of the external power source AC1 or AC2, and force the controller to resume the supply of power and output the control signal to the door operator motor 7 so that the operation of the door operator is resumed.

Figure 5:
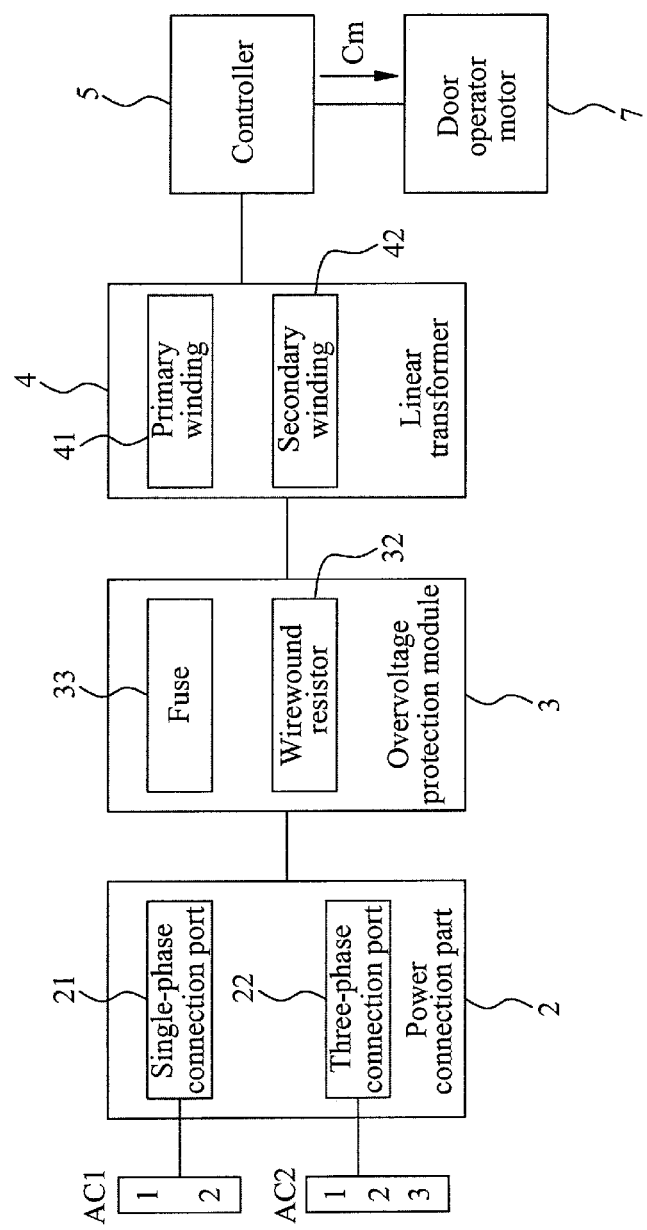
FIG. 5 is a system architecture diagram of a second embodiment of the present invention.
Figure 6:
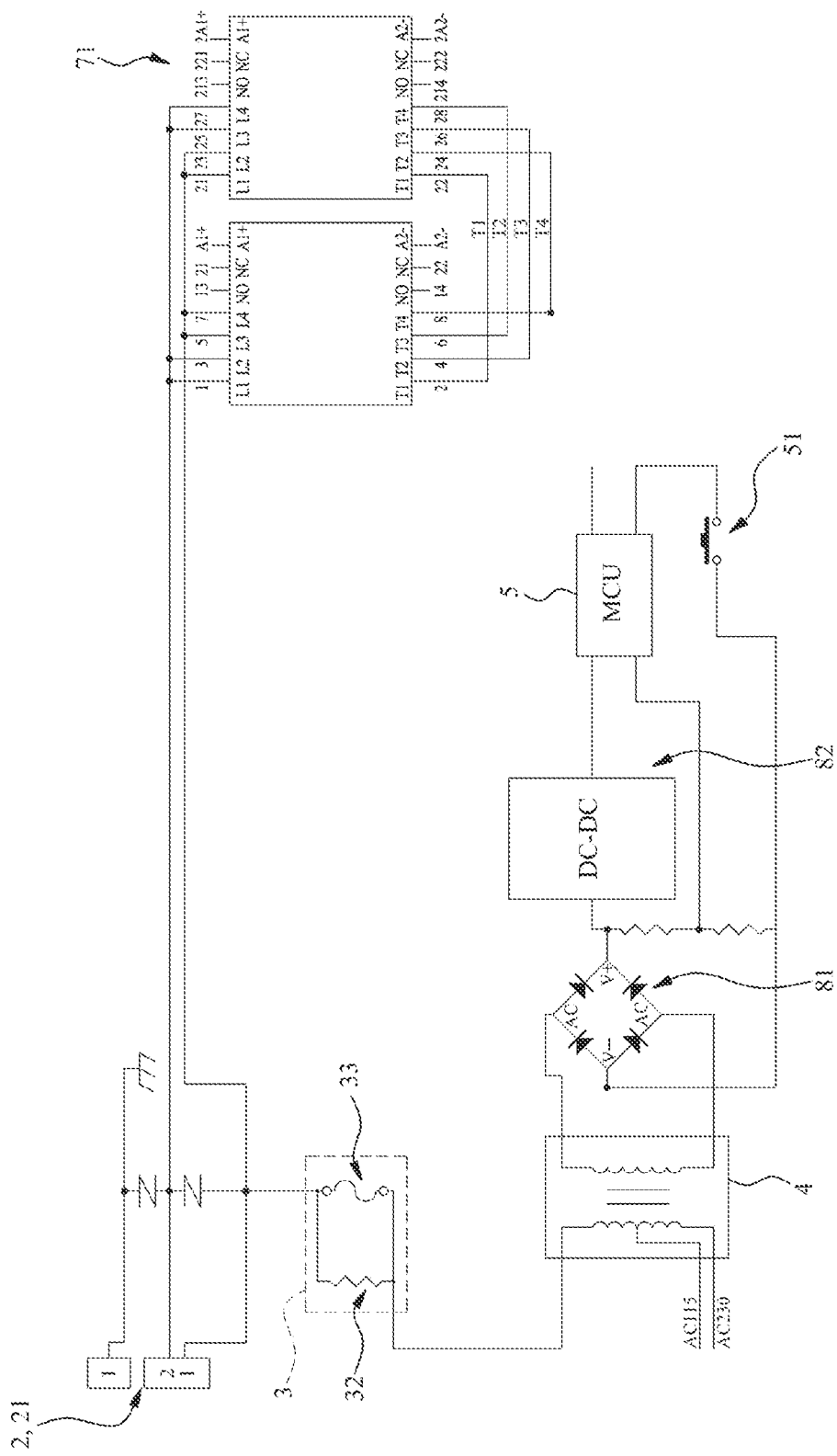
FIG. 6 is a circuit diagram with a single-phase power source connected according to the second embodiment of the present invention.
Figure 7:
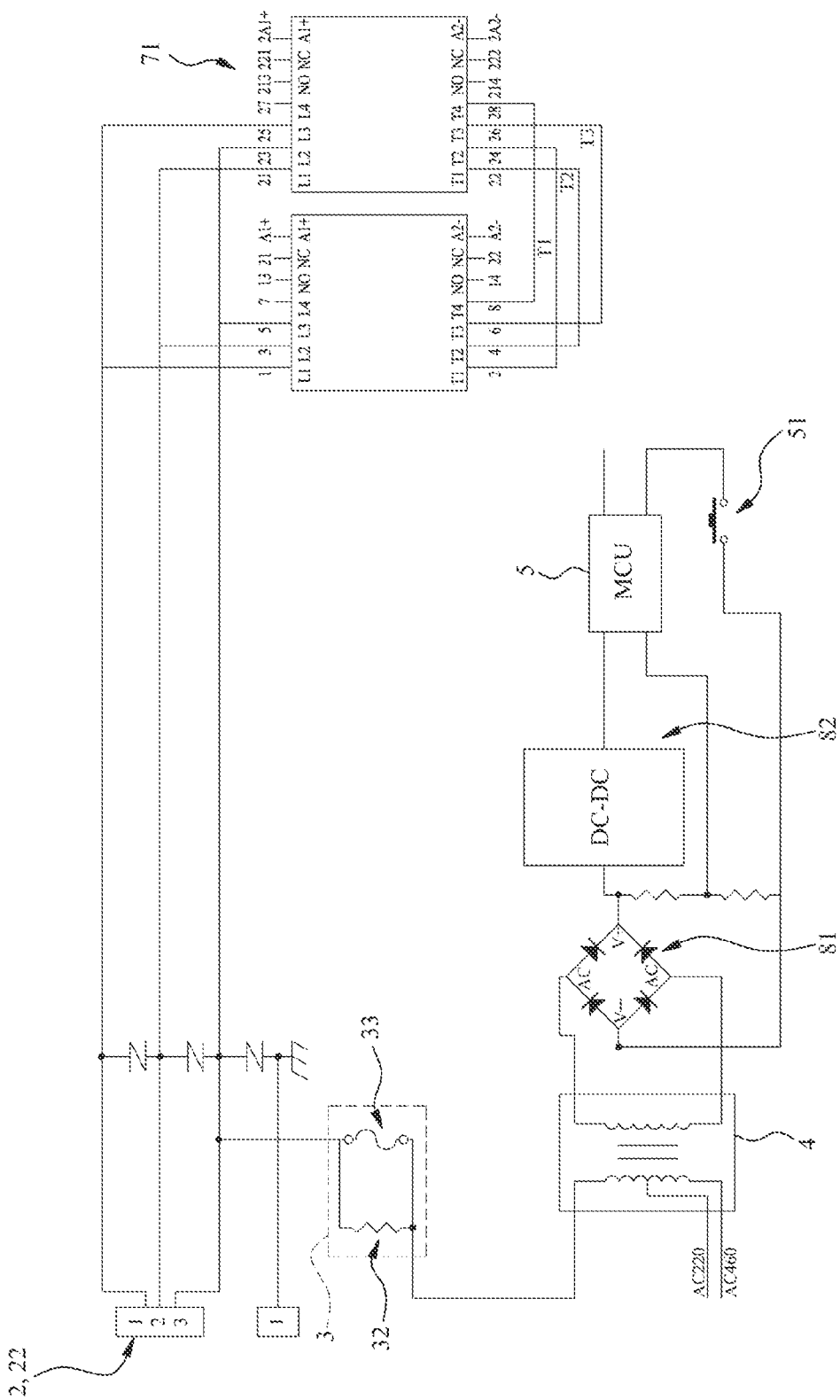
FIG. 7 is a circuit diagram with a three-phase power source connected according to the second embodiment of the present invention.

Reference is made to FIG. 5, FIG. 6 and FIG. 7, wherein FIG. 5 is a system architecture diagram of a second embodiment of the present invention, FIG. 6 is a circuit diagram with a single-phase power source connected according to the second embodiment of the present invention, and FIG. 7 is a circuit diagram with a three-phase power source connected according to the second embodiment of the present invention. As shown in the figures, the main difference between the second embodiment of the present invention and the first embodiment lies in that the thermistor 31 and the switch module 6 of the first embodiment are replaced by a fuse 33 in the second embodiment. A fusible link in the fuse 33 of this embodiment generates great heat and is blown when an excessive current flows through the fuse 33, resulting in an open circuit interrupting the current. Hence, the circuit is protected from damage.

Figure 8:
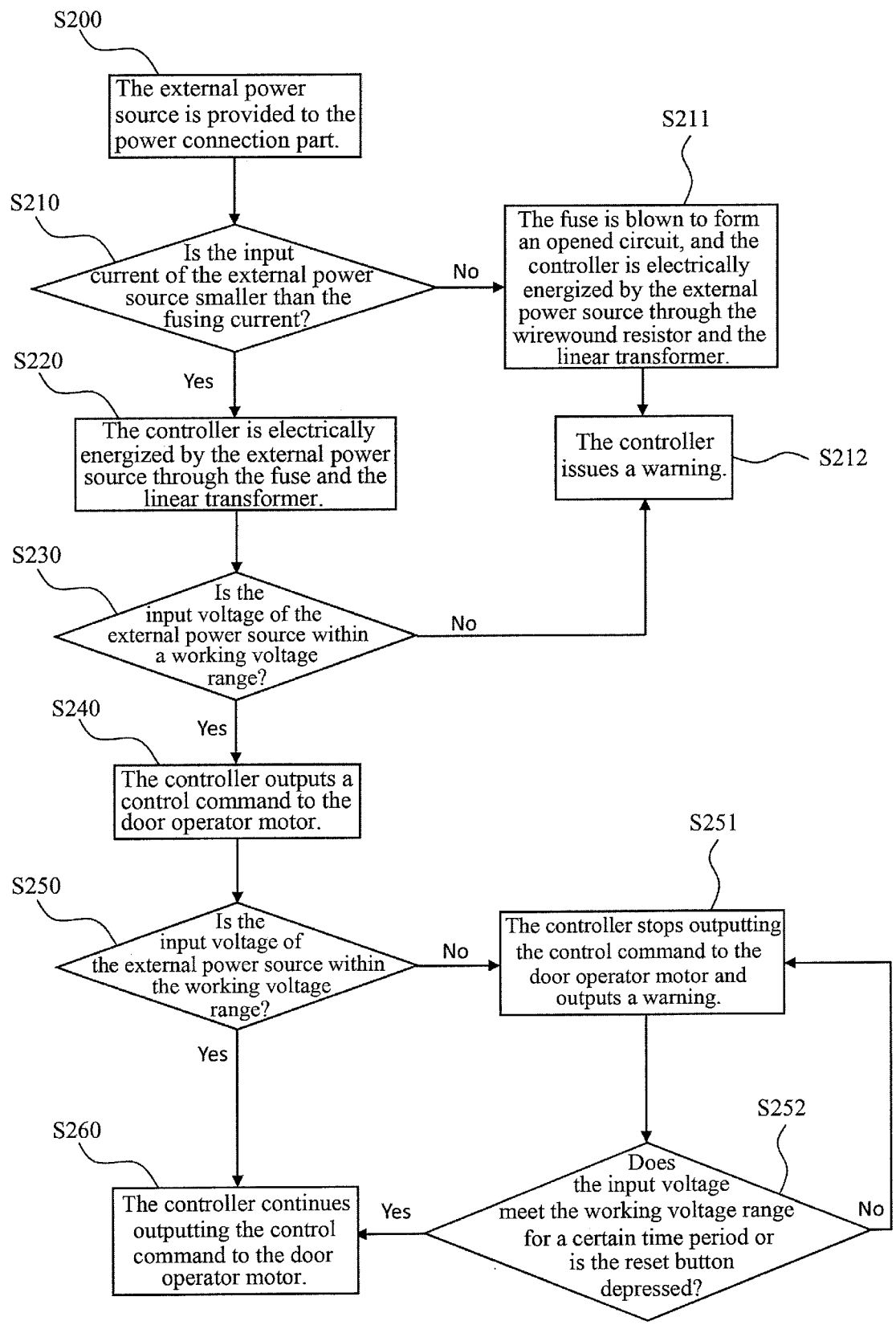
FIG. 8 is a flowchart of a method for abnormal voltage protection according to the second embodiment of the present invention.

Reference is made to FIG. 8 which is a flow chart of a method for abnormal voltage protection according to the second embodiment of the present invention. The operation procedure of this embodiment will be described in detail below. In the step S200, the power connection part 2 is electrically connected to the external power source AC1 or AC2, and the input current of the external power source AC1 or AC2 flows through the fuse 33. If the input current of the external power source AC1 or AC2 is greater than the fusing current, the fuse 33 is blown to form an open circuit so that the current supplied to the controller 5 is interrupted, and the controller 5 is electrically energized by the external power source AC1 or AC2 through the wirewound resistor 32 and linear transformer 4 (the step S211). In the step S212, the controller 5 issues a warning.

If the input current of the external power source AC1 or AC2 is smaller than the fusing current of the fuse 33 (the step S210), the controller 5 is electrically energized by the external power source AC1 or AC2 through the fuse 33 and the linear transformer 4 (the step S220). Next, the controller 5 determines whether the input voltage of the external power source AC1 or AC2 meets a working voltage range (the step S230). If the input voltage does not meet the working voltage range (for example, the input voltage is lower than the working voltage range), the controller 5 issues the warning (the step S212). If the input voltage meets the working voltage range, the controller 5 outputs a control command Cm to the door operator motor 7 so that the door operator motor 7 is activated.

Similarly, in the normal operation state of the door operator, the present embodiment also provides a protection mechanism against the abnormal variation of the input voltage, which will be described in detail as follows. In the step S250 shown in FIG. 8, when the door operator is put into operation, the controller 5 detects the input voltage of the external power source AC1 or AC2 in real time and determines whether the input voltage fluctuates out of the working voltage range. Similar to the first embodiment, the working voltage range is set to the standard voltage of the external power source AC1 or AC2±20%.

If the input voltage of the external power source AC1 or AC2 is in a stable state (i.e. the fluctuation of the input voltage is within ±20%), the controller 5 continues outputting the control command Cm to the door operator motor 7, as shown in the step S260 of FIG. 8.

If the input voltage of the external power source AC1 or AC2 fluctuates suddenly and drastically (i.e. the fluctuation of the input voltage is out of ±20%), the controller 5 stops outputting the control command Cm to the door operator motor 7 so that the operation of the door operator is disabled, and another warning, such as a warning light or a warning sound, is issued to notify the field operator (the step S251).

After the input voltage of the external power source AC1 or AC2 returns to a stable state for a time period, and more specifically after the controller 5 determines that the voltage of the external power source AC1 or AC2 meets the working voltage range for a certain time period, or after the reset button 51 is depressed by the field operator, the controller 5 resumes outputting the control command Cm to the door operator motor 7 and stops issuing the warning, as shown in the step S252 of FIG. 8.

In summary, the door operator with an abnormal voltage protection function and the method for protection of the door operator from abnormal voltage according to the present invention provide at least two protection mechanisms. First, when the door operator is installed, if the input voltage does not meet the preset rated voltage of the door operator, one protection mechanism is activated to prevent excess current from flowing through the back-end circuit and components, so as to avoid the failure of the door operator or damage to the back-end circuit and components, and a warning is issued to notify the field operator. At this time, the field operator needs to connect the door operator to a compatible external power source currently available at the installation site or replace the door operator with another one which is compatible to the external power source currently available at the installation site.

The other protection mechanism provided by the present invention is that after the door operator is installed and put into operation, if the input voltage is unstable (i.e. the input voltage fluctuates out of the working voltage range), the controller disables the operation of the door operator. The operation of the door operator is disabled until the input voltage returns to a normal state or the reset button is forcibly depressed. Once the input voltage returns to a normal state or the reset button is forcibly depressed, the operation of the door operator is resumed. In this way, the present invention can provide the complete abnormal voltage protection mechanisms. In either of the case that the door operator is connected to an incompatible external power source during installation and the case that the input voltage fluctuate drastically during a normal operation of the door operator after installation, failure or damage of the internal circuit or components of the door operator is prevented.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. A door operator with an abnormal voltage protection function, comprising:
   a power connection part;
   an overvoltage protection module, electrically coupled to the power connection part and comprising a thermistor and a wirewound resistor connected in parallel;
   a linear transformer, electrically coupled to the overvoltage protection module;
   a controller, electrically coupled to the linear transformer;
   a switch module, electrically coupled to the controller; and
   a door operator motor, electrically coupled to the controller,
   wherein when the power connection part is electrically connected to an external power source, the controller is electrically energized by the external power source through the thermistor and the linear transformer, and the controller determines whether an input voltage of the external power source is out of a preset range or not;
   when the input voltage meets the preset range, the controller activates the switch module, the controller is electrically energized by the external power source through the switch module, and the controller outputs a control command to the door operator motor;
   when the input voltage is out of the preset range, the controller does not activate the switch module, and when the resistance value of the thermistor increases beyond the resistance value of the wirewound resistor, the controller is electrically energized by the external power source through the wirewound resistor and the linear transformer, and the controller issues a warning.

2. The door operator of claim 1, wherein during a process of electrically energizing the controller by the external power source through the switch module, when the input voltage fluctuates out of a working voltage range, the controller stops outputting the control command to the door operator motor and issues another warning until the controller determines that the input voltage meets the working voltage range for a specific time period; once the controller determines that the input voltage meets the working voltage range for the specific time period, the controller outputs the control command to the door operator motor and stops issuing the another warning.

3. The door operator of claim 2, further comprising a reset button, which is electrically coupled to the controller and used to clear an input voltage detection value temporarily stored in the controller, wherein when the input voltage fluctuates out of the working voltage range, the controller stops outputting the control command to the door operator motor and issues the another warning until the reset button is depressed or the controller determines that the input voltage meets the working voltage range for the specific time period; once the reset button is depressed or the controller determines that the input voltage meets the working voltage range for the specific time period, the controller outputs the control command to the door operator motor and stops issuing the another warning.

4. The door operator of claim 2, wherein the preset range is within 1.5 times of a standard voltage of the external power source; the working voltage range is the standard voltage of the external power source ±20%.

5. The door operator of claim 1, further comprising a rectifier and a DC transformer, wherein the overvoltage protection module is electrically coupled to a primary winding of the linear transformer, the rectifier is electrically coupled to a secondary winding of the linear transformer, the DC transformer is electrically coupled to the rectifier, and the controller is electrically coupled to the DC transformer.

6. A door operator with an abnormal voltage protection function, comprising:
   a power connection part;
   an overvoltage protection module, electrically coupled to the power connection part and comprising a fuse and a wirewound resistor, the fuse and the wirewound resistor being connected in parallel;
   a linear transformer, electrically coupled to the overvoltage protection module;
   a controller, electrically coupled to the linear transformer;
   a door operator motor, electrically coupled to the controller,
   wherein when the power connection part is electrically connected to an external power source with an input current of the external power source being smaller than a fusing current, the controller is electrically energized by the external power source through the fuse and the linear transformer, and the controller determines whether an input voltage of the external power source meets a working voltage range or not; when the input voltage meets the working voltage range, the controller outputs a control command to the door operator motor; when the input voltage is out of working voltage range, the controller issues a warning;
   when the input current of the external power source is greater than the fusing current, the fuse is blown and opened, the controller is electrically energized by the external power source through the wirewound resistor and the linear transformer, and the controller issues the warning.

7. The door operator of claim 6, wherein when during a process of outputting the control command to the door operator motor from the controller, the input voltage fluctuates out of the working voltage range, the controller stops outputting the control command to the door operator motor and issues another warning until the controller determines that the input voltage meets the working voltage range for a specific time period; once the controller determines that the input voltage meets the working voltage range for the specific time period, the controller outputs the control command to the door operator motor and stops issuing the another warning.

8. A method for abnormal voltage protection of a door operator, comprising the steps of:
- (A) providing an external power source to a power connection part, the power connection part being electrically coupled to an overvoltage protection module comprising a thermistor and a wirewound resistor, the thermistor and the wirewound resistor being connected in parallel;
- (B) electrically energizing a controller through the thermistor and a linear transformer by the external power source; and
- (C) determining whether an input voltage of the external power source is out of a preset range nor not by the controller, wherein when the input voltage meets the preset range, the controller activates a switch module so that the controller is electrically energized by the external power source through the switch module, and the controller outputs a control command to a door operator motor;

wherein when the input voltage is out of the preset range, the controller deactivates the switch module, and when a resistance value of the thermistor increases beyond a resistance value of the wirewound resistor, the controller is electrically energized by the external power source through the wirewound resistor and the linear transformer, and the controller issues a warning.

9. The method of claim 8, wherein in the step (C), during a process of electrically energizing the controller by the external power source through the switch module, when the input voltage fluctuates out of a working voltage range, the controller stops outputting the control command to the door operator motor and issues another warning until the controller determines that the input voltage meets the working voltage range for a specific time period; once the controller determines that the input voltage meets the working voltage range for the specific time period, the controller outputs the control command to the door operator motor and stops issuing the another warning.

10. The method of claim 8, wherein in the step (C), in the case that the controller is electrically energized by the external power source through the switch module, when the input voltage fluctuates out of a working voltage range, the controller stops outputting the control command to the door operator motor and issues another warning until a reset button is depressed; once the reset button is depressed, the controller outputs the control command to the door operator motor and stops issuing the another warning, wherein the reset button is electrically coupled to the controller and used to clear an input voltage detection value temporarily stored in the controller.

* * * * *